(12) United States Patent
Kamalov et al.

(10) Patent No.: US 12,117,574 B2
(45) Date of Patent: *Oct. 15, 2024

(54) SYSTEMS AND METHODS FOR DETECTING MECHANICAL DISTURBANCES USING UNDERWATER OPTICAL CABLES

(71) Applicant: Google LLC, Mountain View, CA (US)

(72) Inventors: Valey Kamalov, Gainesville, FL (US); Mattia Cantono, San Clara, CA (US); Vijayanand Vusirikala, Palo Alto, CA (US); Massimiliano Salsi, Sunnyvale, CA (US); Matthew Eldred Newland, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,498

(22) Filed: Jun. 12, 2023

(65) Prior Publication Data

US 2023/0324573 A1    Oct. 12, 2023

Related U.S. Application Data

(63) Continuation of application No. 17/752,969, filed on May 25, 2022, now Pat. No. 11,693,137, which is a
(Continued)

(51) Int. Cl.
*G01V 1/00* (2024.01)
*G01H 9/00* (2006.01)
(Continued)

(52) U.S. Cl.
CPC .............. *G01V 1/01* (2024.01); *G01H 9/004* (2013.01); *G01V 1/282* (2013.01); *G01V 1/307* (2013.01)

(58) Field of Classification Search
CPC ........ G01V 1/008; G01V 1/282; G01V 1/307; G01H 9/004
See application file for complete search history.

(56) References Cited

U.S. PATENT DOCUMENTS 4,458,341 A    7/1984    Goebel
6,072,921 A    6/2000    Frederick et al.
(Continued)

FOREIGN PATENT DOCUMENTS

JP    2019148465 A    9/2019

OTHER PUBLICATIONS

Williams, Ethan F. et al. "Distributed sensing of microseisms and teleseisms with submarine dark fibers." Dec. 18, 2019. Nature Communications. Retrieved from the Internet: <https://doi.org/10.1038/s41467-019-13262-7>. pp. 1-11.
(Continued)

*Primary Examiner* — Elias Desta
(74) *Attorney, Agent, or Firm* — Lerner David LLP

(57) ABSTRACT

Systems and methods are provided for generating a model for detection of seismic events. In this regard, one or more processors may receive from one or more stations located along an underwater optical route, one or more time series of polarization states of a detected light signal during a time period. The one or more processors may transform the one or more time series of polarization states into one or more spectrums in a frequency domain. Seismic activity data for the time period may be received by the one or more processors, where the seismic activity data include one or more seismic events detected in a region at least partially overlapping the underwater optical route. The one or more processors then generate a model for detecting seismic events based on the one or more spectrums and the seismic activity data.

20 Claims, 14 Drawing Sheets

Related U.S. Application Data continuation of application No. 16/794,373, filed on Feb. 19, 2020, now Pat. No. 11,385,365.

(51) Int. Cl.
  *G01V 1/01* (2024.01)
  *G01V 1/28* (2006.01)
  *G01V 1/30* (2006.01)

(56) References Cited

U.S. PATENT DOCUMENTS

| | | | |
|---|---|---|---|
| 8,988,968 B2 * | 3/2015 | Nash | G01H 9/004 |
| | | | 398/79 |
| 9,904,025 B2 | 2/2018 | Debban et al. | |
| 10,648,904 B2 | 5/2020 | Borges et al. | |
| 10,718,658 B2 | 7/2020 | Tadakuma | |
| 11,115,757 B2 | 9/2021 | Doll et al. | |
| 11,693,137 B2 * | 7/2023 | Kamalov | G01V 1/003 |
| | | | 702/15 |
| 2019/0186958 A1 | 6/2019 | Godfrey | |

OTHER PUBLICATIONS

Marra, Giuseppe et al. "Seismology with optical links: enabling a global network for submarine earthquake monitoring." Dec. 2017. Retrieved from the Internet: <https://arxiv.org/ftp/arxiv/papers/1801/1801.02698.pdf>. 10 pages.

Marra, Giuseppe et al. "Ultrastable laser interferometry for earthquake detection with terrestrial and submarine cables." Article. Aug. 3, 2018. Science, vol. 361, pp. 486-490.

Marra, Giuseppe et al. "Ultrastable laser interferometry for earthquake detection with terrestrial and submarine cables." PowerPoint Presentation. Jun. 14, 2018. 5 pages.

Slapak et al. Polarization Changes as Early Warning System in Optical Fiber Networks. Jul. 1, 2019. 2019 42nd International Conference on Telecommunications and Signal Processing (TSP), IEEE, pp. 597-600, DOI: 10.1109/TSP.2019.8768862.

Marra et al. Seismology with optical links: enabling a global network for submarine earthquake monitoring. Dec. 18, 2017. ARXIV.org, Cornell University Library, 201 Olin Library Cornell University Ithaca, NY 14853, 10 pages.

International Search Report and Written Opinion for International Application No. PCT/US2021/018452 dated May 31, 2021. 16 pages.

International Preliminary Report on Patentability for International Application No. PCT/US2021/018452 dated Sep. 1, 2022. 9 pages.

* cited by examiner

300

SYSTEMS AND METHODS FOR DETECTING MECHANICAL DISTURBANCES USING UNDERWATER OPTICAL CABLES

CROSS-REFERENCE TO RELATED APPLICATIONS

The present application is a continuation of U.S. patent application Ser. No. 17/752,969, filed May 25, 2022, which is a continuation of U.S. patent application Ser. No. 16/794,373, filed on Feb. 19, 2020, the disclosures of which arre incorporated herein by reference.

BACKGROUND

Optical telecommunication networks can span across cities, countries, or even continents. To carry optical signals across bodies of water, optical cables may be laid underwater, such as on the floors of oceans, rivers, lakes, etc. External effects, such as cuts or pinches on the underwater optical cable, and other movements in the optical cable's environment, such as earthquakes, may cause changes to the characteristics of the light signals that are different from random variations under normal circumstances. For instance, seismic waves resulting from an earthquake may perturb optical phases of light signals propagated through the optical cable. Such optical phase perturbations may be detected at receiving stations, and analyzed using frequency metrology techniques in order to detect earthquakes. However, accurate detections of optical phase and perturbations require special equipment that is not part of the existing optical networks used for telecommunication. For example, accurate detections using frequency metrology may require ultrastable lasers with narrow bandwidths. This equipment may be highly sensitive to changes in the environment, including vibrations and temperature changes in the optical cables, which may affect the reliability of the detections.

BRIEF SUMMARY

The present disclosure provides for receiving, by one or more processors from one or more stations located along an underwater optical route, one or more time series of polarization states of a detected light signal during a time period; transforming, by the one or more processors, the one or more time series of polarization states into one or more spectrums in a frequency domain; receiving, by the one or more processors, seismic activity data for the time period, the seismic activity data including one or more seismic events detected in a region at least partially overlapping the underwater optical route; and generating, by the one or more processors based on the one or more spectrums and the seismic activity data, a model for detecting seismic events.

The one or more time series of polarizations states may include a plurality of time series, and each of the plurality of time series includes values for a respective Stokes parameter of a plurality of Stokes parameters.

The seismic activity data may include at least one of: whether one or more earthquakes have been detected, timing information of the one or more earthquakes, location information of the one or more earthquakes, magnitude information of the one or more earthquakes, characteristic frequencies of the one or more earthquakes. The magnitude information of the one or more earthquakes may be proportional to magnitude of changes in polarization states.

The method may further comprise filtering, by the one or more processors, from the one or more spectrums to remove data points in one or more frequency ranges, wherein the model is generated using the filtered spectrums.

The method may further comprise extracting, by the one or more processors, statistics from the one or more time series of polarization states, wherein the model is further generated based on the extracted statistics; wherein the extracted statistics may include at least one of: instantaneous velocity of the polarization states, instantaneous acceleration of the polarization states.

The model may be further trained to determine at least one of: timing of a seismic event, a location of a seismic event, and a magnitude of a seismic event.

The method may further comprise receiving, by the one or more processors, a set of time series of polarization states; providing, by the one or more processors, the set of time series of polarization states as input to the generated model; receiving, by the one or more processors from the generated model, output including whether any seismic events are detected in the set of time series of polarization states.

The method may further comprise determining, by the one or more processors using the generated model, a location of a seismic event detected in the set of time series of polarization states, wherein the set of time series of polarization states may include a first time series of polarization states detected by a first station at a first location along the underwater optical route and a second time series of polarization states detected by a second station at a second location along the optical route, and wherein the location of the seismic event is determined based on a difference between detection times by the first station and the second station.

The method may further comprise determining, by the one or more processors using the generated model, timing of a seismic event detected in the set of time series of polarization states, wherein the set of time series of polarization states includes a first time series of polarization states detected by a first station at a first location along the underwater optical route and a second time series of polarization states detected by a second station at a second location along the optical route, and wherein the timing of the seismic event is determined based on detection times by the first station and the second station.

The set of time series of polarization states may further include a third time series of polarization states detected by a third station at a third location and a fourth time series of polarization states detected by a fourth station, and the location of the seismic event is determined further based on a difference between detection times by the third station and the fourth station, and wherein the third station and the fourth station are located along a different optical route than the first station and the second station. The set of time series of polarization states may further include a third time series of polarization states detected by a third station at a third location and a fourth time series of polarization states detected by a fourth station, and a magnitude of the seismic event is determined further based on a detection by the third station and the fourth station, and wherein the third station and the fourth station are located along a different optical route than the first station and the second station.

The set of time series of polarization states may include a plurality of time series of polarization states, each time series being polarization states of a light signal looped back from a respective repeater of a plurality of repeaters positioned along the optical route, wherein the location of the seismic event is determined based on which of the plurality of time series of polarization states is the seismic event detectable.

The set of time series of polarization states may include a first time series of polarization states for a light signal of a first wavelength detected by a first station at a first location along the underwater optical route, a second time series of polarization states for a light signal of a second wavelength detected at the first station, a third time series of polarization states for a light signal of the first wavelength detected by a second station at a second location along the optical route, a fourth time series of polarization states for a light signal of the second wavelength detected at the second station, and wherein the location of the seismic event is determined based on differences between detection times of the light signals of the first and second wavelengths by the first and second stations.

The present disclosure further provides for a system comprising one or more processors. The one or more processors are configured to receive, from one or more stations located along an underwater optical route, one or more time series of polarization states of a detected light signal during a time period; transform the one or more time series of polarization states into one or more spectrums in a frequency domain; receive seismic activity data for the time period, the seismic activity data including one or more seismic events detected in a region at least partially overlapping the underwater optical route; and generate, based on the one or more spectrums and the seismic activity data, a model for detecting seismic events.

The one or more processors may be further configured to divide the time period into a plurality of time windows; divide each time series of polarization states into a plurality of time series each corresponding to a respective time window of the plurality of time windows, wherein the transformation is applied separately for each respective time window resulting in a spectrum for each respective time window.

The one or more processors may be further configured to train the model to determine at least one of: a timing of a seismic event, a location of a seismic event, a characteristic frequency of a seismic event.

The one or more processors may be further configured to receive a set of time series of polarization states; provide the set of time series of polarization states as input to the generated model; receive, from the generated model, output including whether any seismic events are detected in the set of time series of polarization states.

The system may further comprise one or more receivers configured to detect the polarization states of the light signal, and generate the polarization states as time series.

The present disclosure still further provides for a non-transitory computer-computer-readable storage medium storing instructions executable by one or more processors for performing a method. The method comprises receiving, from one or more stations located along an underwater optical route, one or more time series of polarization states of a detected light signal during a time period; transforming the one or more time series of polarization states into one or more spectrums in a frequency domain; receiving seismic activity data for the time period, the seismic activity data including one or more seismic events detected in a region at least partially overlapping the underwater optical route; and generating, based on the one or more spectrums and the seismic activity data, a model for detecting seismic events.

DETAILED DESCRIPTION

Overview

Figure 1:
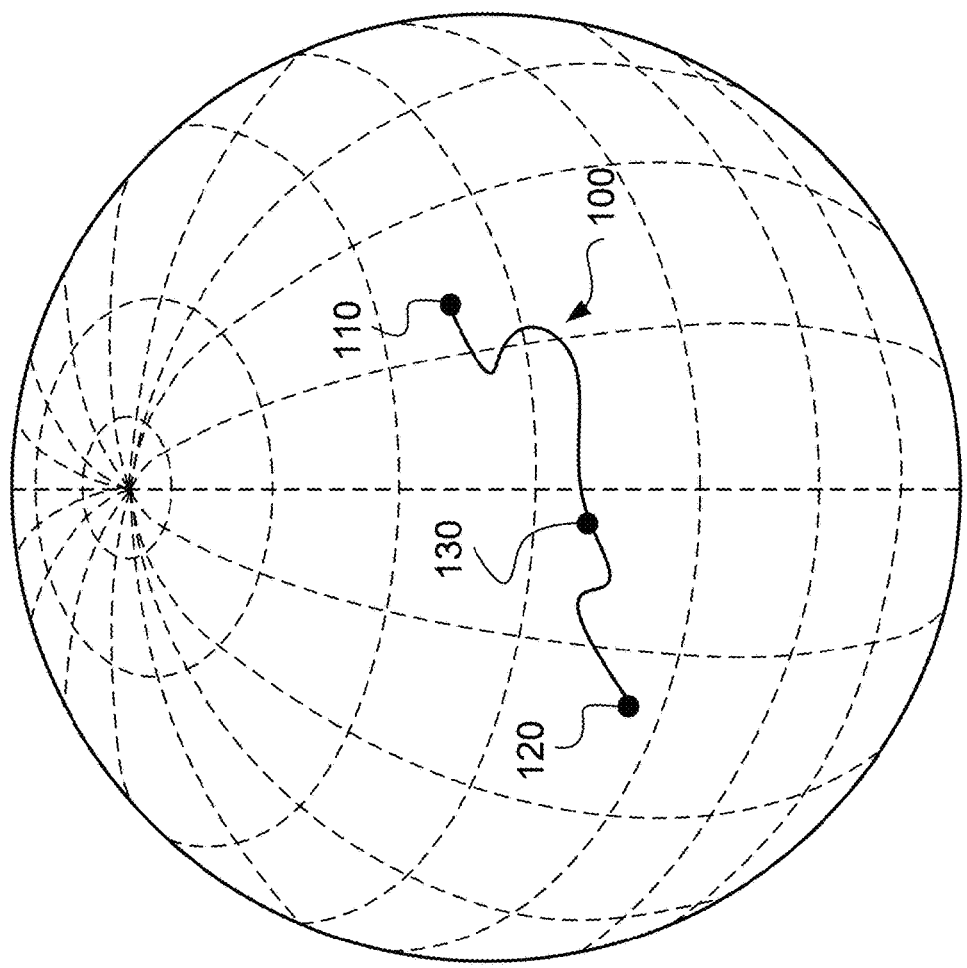
FIG. 1 is a pictorial diagram illustrating an example optical route in accordance with aspects of the disclosure.

The technology generally relates to detection of seismic events based on characteristics of light signals propagated through underwater optical cables. In this regard, a model, such as a machine learning model, may be trained to detect seismic events based on polarization states of light signals propagating through underwater optical cables. For instance, time series of polarization states of a light signal detected at one or more stations along an underwater optical route may be received during a time period. Since seismic events typically have characteristic frequencies, the one or more time series of polarization states may be transformed into one or more spectrums in a frequency domain.

Seismic activity data for the time period may also be received, where the seismic activity data include one or more seismic events detected in a region at least partially overlapping the underwater optical route. By referring to the seismic activity data, the spectrums transformed from the time series of polarization states may be labeled with whether seismic events are detected. A model may then be trained using the labeled spectrums, for example to recognize patterns in the spectrums that correspond to detected seismic events. Once generated, the model may be used to detect seismic events based on polarization states detected along underwater optical routes, and output the detected seismic events as results.

The model may be further trained to determine characteristics of seismic events. For instance, by referencing the seismic activity data received, the spectrums may be labeled with additional information, such as timing of the seismic events, magnitude and characteristic frequencies of the seismic events, etc. Using training data labeled with such additional information, the model may be trained to recognize patterns in the spectrums that correspond to one or more characteristics of seismic events.

Additionally, locations of the seismic events may also be determined based on characteristics of light signals propagated through underwater optical cables. For instance, the model may output a first result including timing information on a detected seismic event based on polarization states collected by a first station, the model may also output a second result including timing information on the same seismic event based on polarization states collected by a second station. As such, a location of the detected seismic event may then be determined using the timing information from the two results, such as differences in detection times. Alternatively or additionally, the model described above may be further trained to determine locations for detected seismic events, and generate the locations as part of the output. For instance, spectrums in frequency domain may be derived from polarization states collected from multiple stations for a same time period, each of which may be labeled with the location of a same detected seismic event based on seismic activity data. The model may then be trained with the labeled spectrums to determine locations of detected seismic events using polarization states from multiple stations.

The technology is advantageous because it leverages existing telecommunication infrastructure for the detection of seismic activities without requiring additional equipment. The current expansive network of underwater optical cables may provide greater coverage of underwater seismic events than the very few existing underwater seismic stations. Detection of seismic events underwater may assist in planning of underwater activities, including selection of optical routes, submarine routes, fishing routes, etc. Detection of underwater seismic events may also be used to achieve a better understanding of terrestrial seismic activities, which may affect many human lives. The model can be refined and refreshed based on human feedback and newly detected seismic events.

Example Systems

FIG. 1 shows an example optical route 100 in an optical network in accordance with aspects of the disclosure. Along the optical route 100, light sources, transmitters, and receivers may be provided to transmit and receive light signals at a plurality of stations, such as at station 110, station 120, and station 130, connected through one or more optical cables. Although not shown, components such as repeaters and mirrors may be provided along the optical route 100 to extend the reach of optical signals between two stations by regenerating the optical signals. A station may be configured to route optical signals to other stations in the network. For instance, station 110 and station 120 are configured to route optical signals via optical cables to other stations, including to each other via station 130. Station 130 is configured to route optical signals to both station 110 and station 120, and may also be configured to route optical signals to additional stations not shown in FIG. 1.

An optical route may include one or more stations and/or portions of optical cables that are located underwater, for example along ocean floors or riverbeds. For example, optical route 100 and stations 110, 120, 130 may be fully or partially underwater. Although not shown, the optical route 100 may be connected to one or more other optical routes in the network, which may be on land or underwater. Further, although only a few stations are shown along one optical route in FIG. 1, it should be understood that in practical systems an optical route of an optical network may include many stations.

Stations along the optical route 100 are configured to communicate with one another by modulating light signals transmitted between one another. Thus, a transmitter at one station may modulate a carrier light signal from a coherent light source, such as a laser, to encode data, and a receiver at another station may detect and decode the modulated light signal to recover the data. For instance, amplitude, phase, intensity, and/or other characteristics of a carrier light signal may be modulated to encode the data. In that regard, though not shown in FIG. 1, each station may include one or more processors, for example each transmitter and/or receiver may include a digital signal processor (DSP) for analyzing the light signals, including encoding and decoding data. The stations may also include digital-to-analog converters, analog-to-digital converters, hybrids, beam splitters, amplifiers, photodetectors, and/or other optical or electrical components for transmitting, receiving, and modulating light signals. Further, since the properties of a light signal can randomly change during transmission, the receiver system needs to perform recovery of these properties once the light signal is received. In that regard, each station may include a local oscillator (LO), and interference may be performed between the received light signals and the LO to recover the properties of the carrier light signal.

External effects that cause mechanical disturbances to the optical cable, such as cuts or pinches on the optical cable, and other movements in the optical cable's environment, such as movement of vessels, movement of anchors, collisions, earthquakes, tsunamis, etc., may result in changes in the characteristics of the light signals that are different from random variations under normal circumstances. For example, mechanical deformations, including earthquakes and tsunamis, may cause changes in birefringent properties of optical cables, which may in turn cause changes in characteristics of light propagation through the optical cables that can be detected at a receiver. As described above, characteristics of light signals are already collected and analyzed at stations along an optical route, for example by a DSP at a receiver station in order to decode data encoded in the light signals. As described in the example methods below, such data on the characteristics of the light signals may be further used to generate a model for detection of seismic events.

Figure 2:
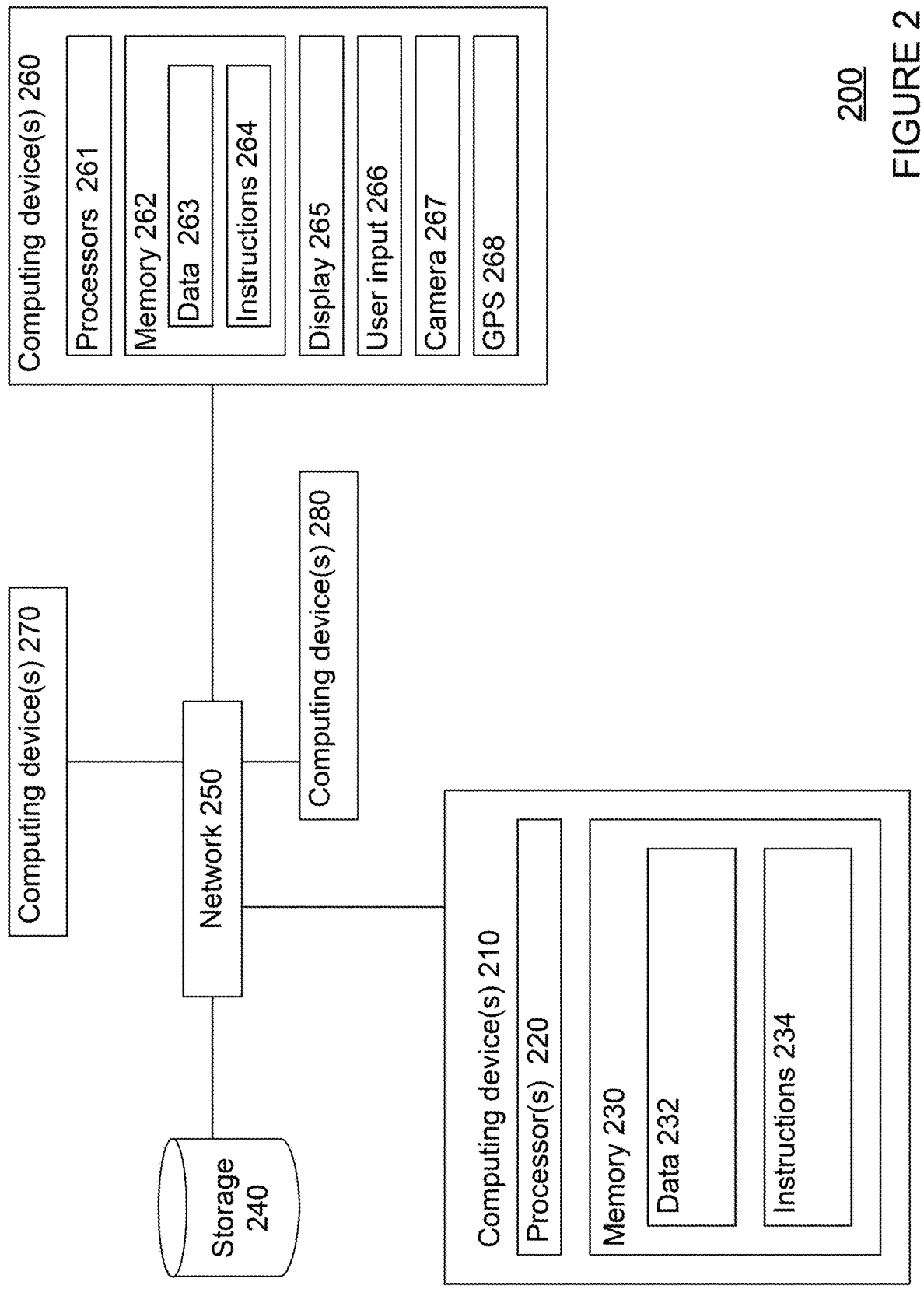
FIG. 2 is an example block diagram showing an example system for generating models for detection of seismic events in accordance with aspects of the disclosure.

FIG. 2 illustrates an example system used to generate a model for detection of seismic events. It should not be considered as limiting the scope of the disclosure or usefulness of the features described herein. In this example, system 200 can include one or more computing devices 210 in communication with one or more computing devices 260, 270, 280, as well as storage system 240, through a network 250. Each of the computing devices 210, 260, 270, 280 may contain one or more processors, memory, and other components typically present in general purpose computing devices. For instance, memory 230 of the computing devices 210 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories. For instance, the data 232 may include seismic activity data from seismic stations, geographic coordinates of optical routes including stations and optical cables, data on characteristics of light signals including polarization states, parameters and thresholds for training models, generated models for detecting seismic events, etc.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below. For instance, the instructions 234 may include how to process data on the light signals and the seismic activity data, how to generate models for detection of seismic events, how to use the models to detect and/or locate seismic activities, etc.

Data 232 may be retrieved, stored, or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, propriety codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application-specific integrated circuit ("ASIC") or other hardware-based processor. Although not necessary, the computing devices 210 may include specialized hardware components to perform specific computing processes.

Although FIG. 2 functionally illustrates the processor, memory, and other elements of computing devices 210 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 250.

Each of the computing devices 210, 260, 270, 280 can be at different nodes of a network 250 and capable of directly and indirectly communicating with other nodes of network 250. Although only a few computing devices are depicted in FIG. 2, it should be appreciated that a typical system can include a large number of connected computing devices, with each different computing device being at a different node of the network 250. The network 250 and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 210 may be server computing devices, computing devices 260 may be client computing devices, computing devices 270 may be one or more DSPs located along an optical route, and computing devices 280 may be one or more computers at a seismic station. Computing devices 210 may include web servers capable of communicating with storage system 240 as well as computing devices 260, 270, 280 via the network 250. For example, computing devices 210 may be server computing devices that can use network 250 to transmit and present information to a user on a display, such as display 265 of computing device 260. Computing devices 210 may use network 250 to receive data from computing devices 270, such as data on characteristics of light signals detected at stations 110 and/or 120 of FIG. 1. Computing devices 210 may also use network 250 to receive data from computing devices 280, such as seismic activity data from a seismic station. Alternatively, data on characteristics of light signals detected along underwater optical routes and/or seismic activity data collected from seismic stations may be uploaded and stored at storage 240, and made accessible to the computing devices 210.

Each of the computing devices 260, 270, 280 may be configured similarly to the server computing devices 210, with one or more processors, memory and instructions as described above. The client computing device 260 may be a personal computing device intended for use by a user, and have all of the components normally used in connection with a personal computing device. For example as shown, client computing device 260 includes processors 261 (e.g., a central processing unit CPU), memory 262 (e.g., RAM and internal hard drives) storing data 263 and instructions 264, a display such as display 265 (e.g., a monitor having a screen, a touch-screen, a projector, a television, or other device that is operable to display information), and user input device 266 (e.g., a mouse, keyboard, touch-screen, or microphone). The client computing device 260 may also include a camera 267 for recording video streams and/or capturing images, speakers, a network interface device, and all of the components used for connecting these elements to one another. The client computing device 260 may also include a location determination system, such as a GPS 268. Other examples of location determination systems may determine location based on wireless access signal strength, images of geographic objects such as landmarks, semantic indicators such as light or noise level, etc.

Although the client computing devices 260 may comprise a full-sized personal computing device, they may alternatively comprise mobile computing devices capable of wirelessly exchanging data with a server over a network such as the Internet. By way of example only, client computing devices 260 may be a mobile phone or a device such as a wireless-enabled PDA, a tablet PC, a netbook, a smartwatch, a head-mounted computing system, or any other device that is capable of obtaining information via the Internet. As an example the user may input information using a small keyboard, a keypad, microphone, using visual signals with a camera, or a touch screen.

As with memory 230, storage system 240 can be of any type of computerized storage capable of storing information accessible by the server computing devices 210, such as a hard-drive, memory card, ROM, RAM, DVD, CD-ROM, write-capable, and read-only memories. In addition, storage system 240 may include a distributed storage system where data is stored on a plurality of different storage devices which may be physically located at the same or different geographic locations. As shown, storage system 240 may be connected to various computing devices via the network 250, and/or may be directly connected to any of the computing devices 210, 260, 270, and 280.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 3:
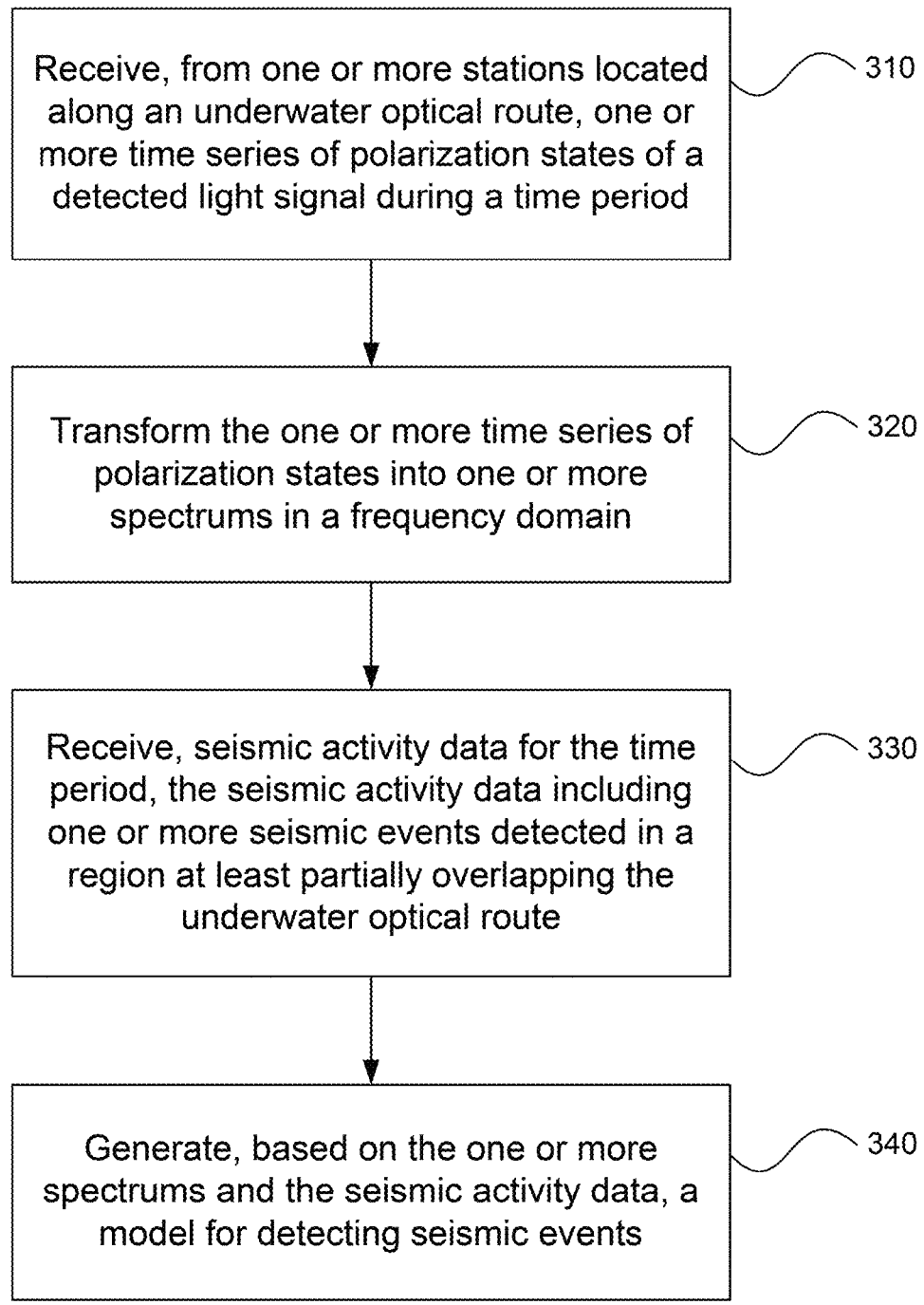
FIG. 3 is an example flow diagram showing an example method for generating models for detection of seismic events in accordance with aspects of the disclosure.

FIG. 3 shows an example flow diagram 300 for generating a model for detection of seismic events. Flow diagram 300 may be performed by one or more processors, such as one or more processors 220 shown in FIG. 2. For example, processors 220 may receive data and make various determinations as shown in the flow diagram 300. Further, FIGS. 4A-7 provide example illustrations of various aspects of the flow diagram 300, and are therefore described below in conjunction with the flow diagram 300.

Referring to FIG. 3, at block 310, one or more time series of polarization states of a light signal detected during a time period are received from one or more stations located along an underwater optical route. For instance, the one or more stations may be located along the underwater optical route 100 of FIG. 1. The light signal may be used for communication between stations along the optical route 100, such as through modulation and decoding as described with reference to FIG. 1. In this regard, the one or more time series of polarization states may be collected as part of the modulation and decoding processes performed by the stations when light signals are transmitted and/or received. The one or more time series may be received from one station, such as station 110, or may be received from multiple stations along a same optical route, such as stations 110 and 120, or may also be received from multiple stations along multiple optical routes. The one or more time series may be sent, for example, by one or more DSPs located in the one or more stations to the processors 220, or to the storages 240 accessible to the processors 220. The time period for the one or more time series may be any length of time period, such as seconds, minutes, hours, days, weeks, months, etc. The time series may include measurements taken at predetermined time intervals, such as on the order of milliseconds, microseconds, etc.

Figure 4A:
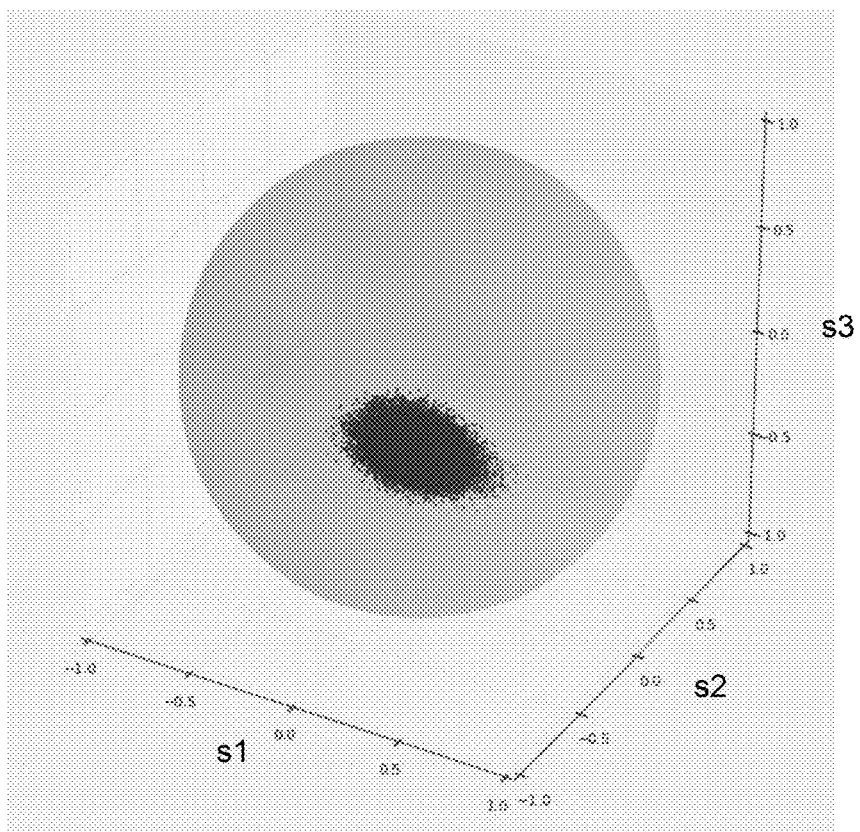
FIGS. 4A-D show example time series of polarization states in accordance with aspects of the disclosure.
Figure 4B:
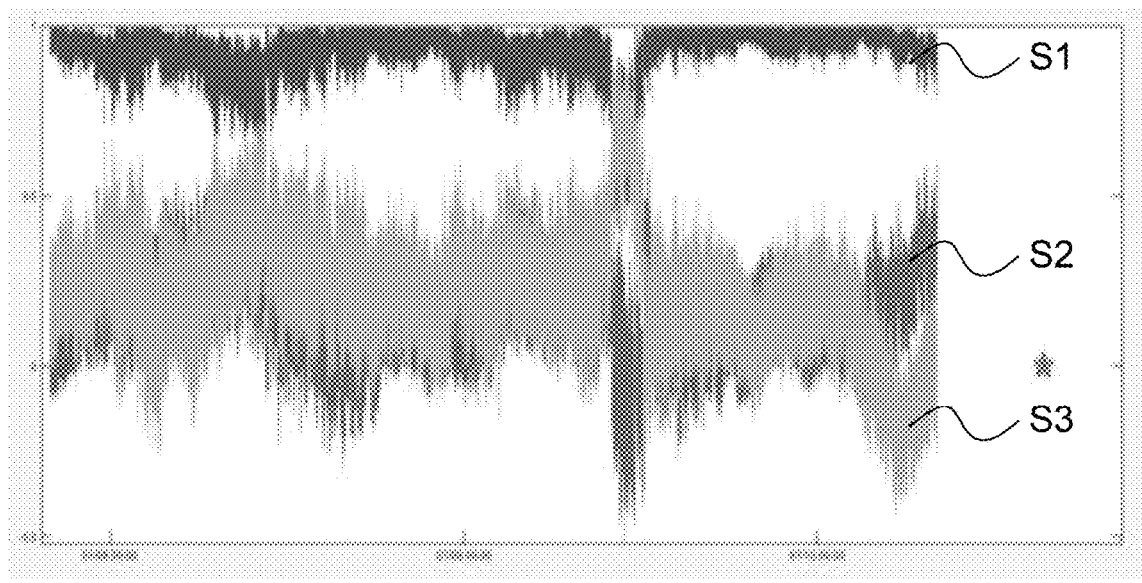
Figure 4D:
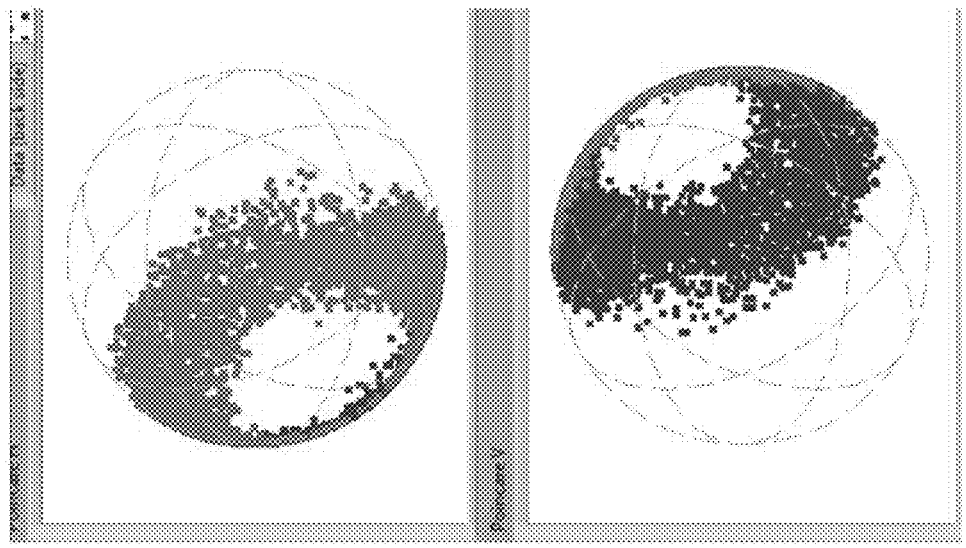
Figure 4C:
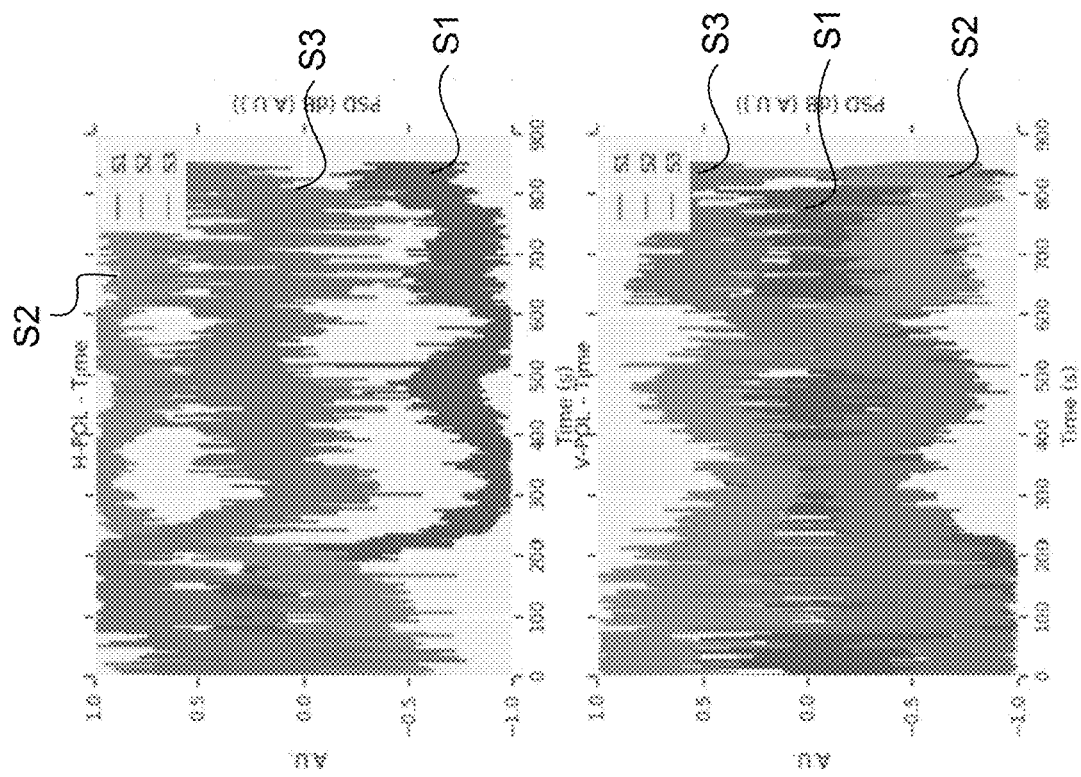

FIGS. 4A-4D illustrate example time series of polarization states. While FIGS. 4A and 4B show example polarization states of coherent light signals propagated through underwater optical cables, FIGS. 4C and 4D show example polarization states of coherent light signals propagated through terrestrial optical cables.

Referring to FIG. 4A, polarization states can be collected as a time series of data points, and each such data point may be plotted on a Poincare sphere. In this regard, a polarization state S can be represented by Stokes parameters $S0=I$, $S1=Ip \cos 2\Psi \cos 2\chi$, $S2=Ip \sin 2\Psi \cos 2\chi$, and $S3=Ip \sin 2\Psi$, where I is the total intensity of a detected light beam, p is a degree of polarization, and $\Psi$ and $\chi$ are Poincare parameters. The example polarization states of FIG. 4A are collected for a coherent light signal received at a station located along an underwater optical route over a one-night time period. As shown, these polarization states are concentrated in a small region of the Poincare sphere, which indicates that polarization states of a coherent light signal propagating in underwater cables exhibit high stability over the period of time.

FIG. 4B shows that, since a polarization state may be represented by multiple Stoke parameters, a time series may be collected for each individual Stoke parameter. For instance, the one or more processors may receive a time series for only one of the Stokes parameters, such as S1, and use the time series to train a model for detection of seismic events. Alternatively, the one or more processors may receive a time series for each Stoke parameter S1, S2, S3 as shown in FIG. 4B, and use the three time series to train a model for detection of seismic events. Still other alternatives may be possible, such as using two of the Stokes parameters, using all four Stokes parameters, etc. The time series in FIG. 4B include Stokes parameters collected over a one-minute time period, and the small fluctuations in each time series indicate that each of the Stokes parameters for a coherent light signal propagating in underwater cables exhibits high stability over the period of time.

In contrast, example polarization states of coherent light signals propagating through optical cables on land are shown in FIGS. 4C and 4D. FIG. 4C shows polarization states of a light signal collected over a period of 2000 seconds, and FIG. 4D shows polarization states of a light signal collected over a period of 20 seconds. Both time series show that polarization states of a light signal propagating in terrestrial cables are highly unstable as compared to a light signal propagating in underwater cables shown in FIGS. 4A and 4B. The large fluctuations may make detections of disturbances such as seismic events using polarization states of light signals propagating through terrestrial cables difficult or unreliable. Conversely, the stability of polarization states of light signals propagating in underwater cables may allow disturbances such as seismic events to be detected more easily and reliably using underwater cables.

Returning to FIG. 3, at block 320, the one or more time series of polarization states are transformed into one or more spectrums in a frequency domain. A seismic event may be detected based on its characteristic frequency. For example, an earthquake may have a characteristic frequency associated with seismic waves originating from its epicenter. Detecting such characteristic frequencies and/or other patterns associated with the seismic waves may allow detections of the underlying seismic events. Thus, to perform analysis of the frequencies, the one or more time series of polarization states may be transformed, for example by applying a Fourier transform or other similar methods for spectral estimation, from a time domain into one or more spectrums in a frequency domain.

Figure 5:
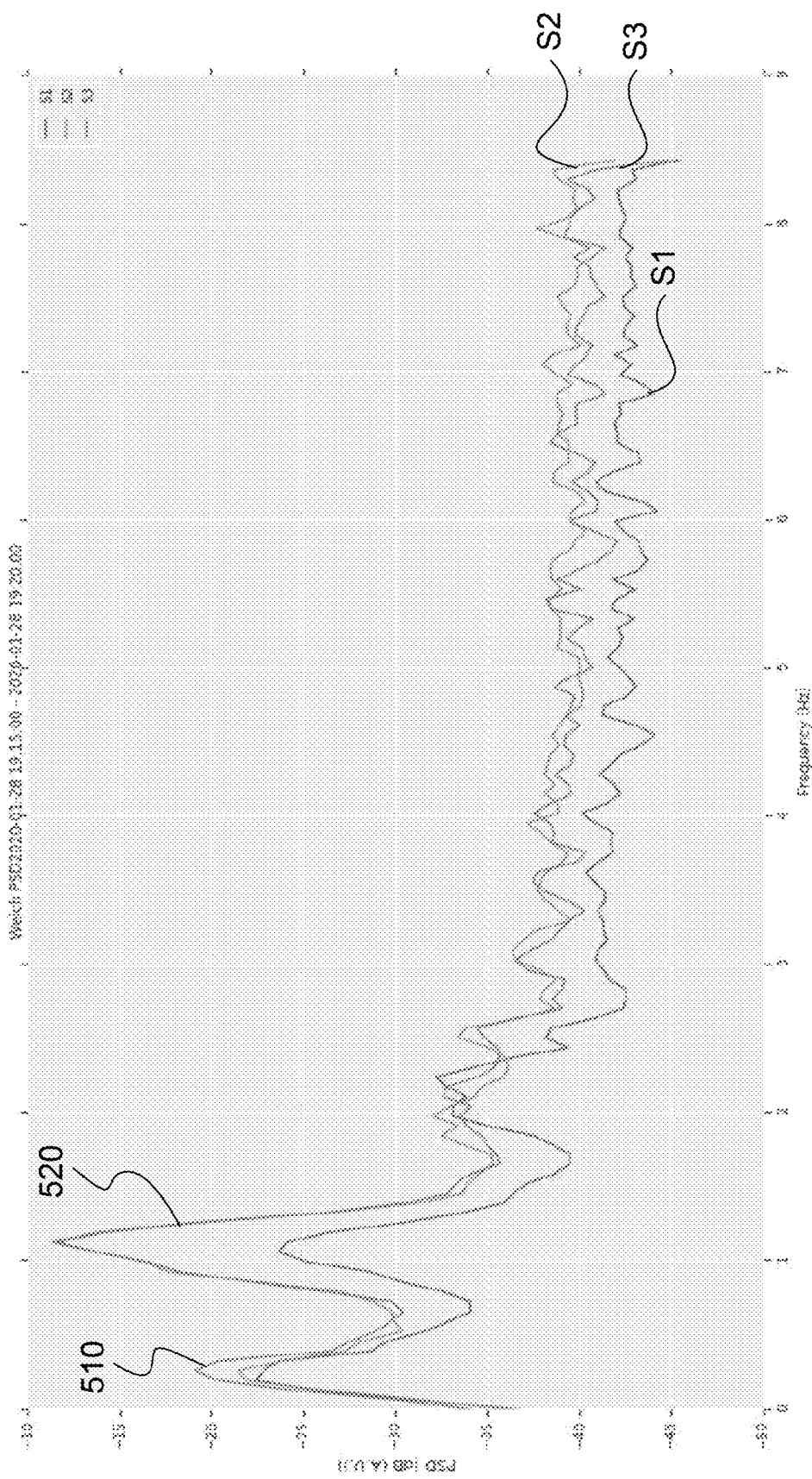
FIG. 5 shows example transformations of time series of polarization states into spectrums in a frequency domain in accordance with aspects of the disclosure.

FIG. 5 illustrates example transformations of time series of polarization states into spectrums in a frequency domain. In particular, FIG. 5 shows the resulting spectrums in frequency domain by applying a Welch periodogram to time series of polarization states captured within a five-minute time period. In the example shown, the Welch periodogram is applied separately to each of three time series of Stokes parameters S1, S2, S3, resulting in three spectrums. Other alternatives may be possible, such as applying a Welch periodogram to only one or two of the Stokes parameters resulting in only one or two spectrums. The example spectrums of FIG. 5 show a peak 510 centered around 0.25-0.3 Hz and another peak 520 centered around 1.2 Hz, which may or may not correspond to seismic events. However, by correlating with seismic activity data from seismic stations, the spectrums in the frequency domain may be used as training data for generating a model to for detection of seismic events, as described further below.

Figure 6:
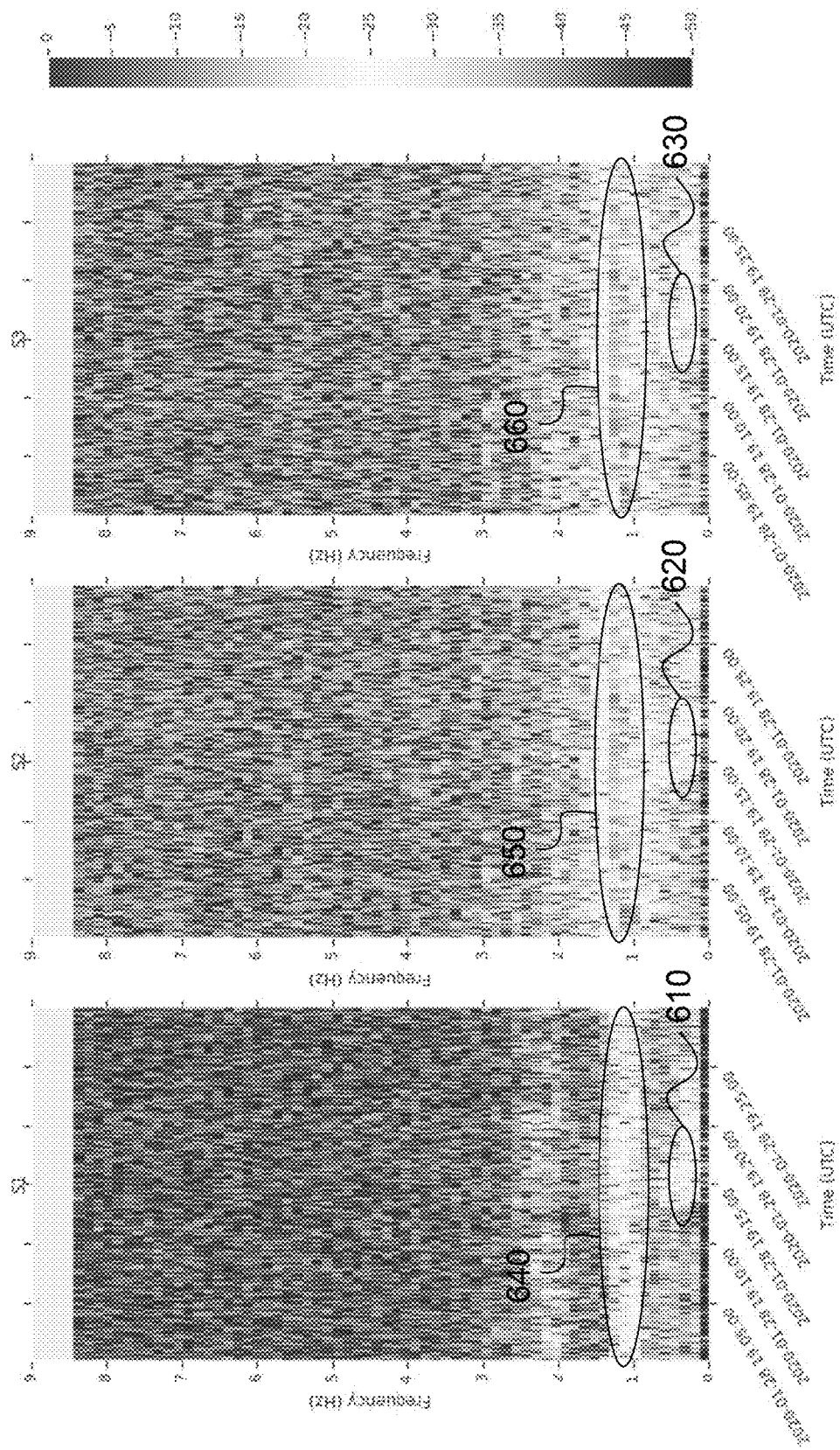
FIG. 6 shows example transformations of time series of polarization states into spectrograms in a frequency domain in accordance with aspects of the disclosure.

FIG. 6 illustrates other example transformations of time series of polarization states into spectrums in a frequency domain. Like FIG. 5, FIG. 6 also shows the resulting spectrums in frequency domain by applying a Welch periodogram to time series of polarization states. However, FIG. 6 further shows the frequency spectrums as a function of time, where the x-axis shows time, the y-axis shows frequency, and the intensity of the frequencies are represented by color or grayscale. In this regard, the timing information may be extracted by dividing time series of polarization states received in a time period into multiple time windows. Welch periodogram may then be applied to each time series corresponding to each time window, resulting in a spectrum for each time window. The polarization states in frequency domain for the entire time period may be represented in a two-dimensional spectrogram.

For instance, the example of FIG. 6 may be generated using three time series of polarization states, one for each of S1, S2, S3, received for a 30-minute time period from 19:00:00 to 19:30:00 on date 2020 Jan. 28. Each of these time series may be divided into a plurality of time series corresponding to a smaller time window, for example a 1-minute time window, resulting in 30 time series for each of S1, S2, and S3. Welch periodogram may then be applied to each of the 30 time series, resulting in 30 spectrums for each of S1, S2, and S3. Thus, there is a spectrum for each time window ranging from 19:00:00 to 19:30:00, which may then be represented in the two-dimensional spectrograms as shown in FIG. 6. FIG. 6 further shows that timing of seismic events may be determined based on the spectrograms. As shown, high intensity regions 610, 620, 630 with a frequency of around 0.25-0.3 Hz are found in time windows between 19:15:00 and 19:20:00, and high intensity regions 640, 650, 660 with a frequency of around 1.2 Hz are found through the entire time period between 19:00:00 and 19:30:00. These frequencies may or may not correspond to seismic events. As described further below, by correlating with seismic activity data from seismic stations, the spectrums in frequency domain may then be used as training data for generating a model for detection of seismic events.

Figure 7:
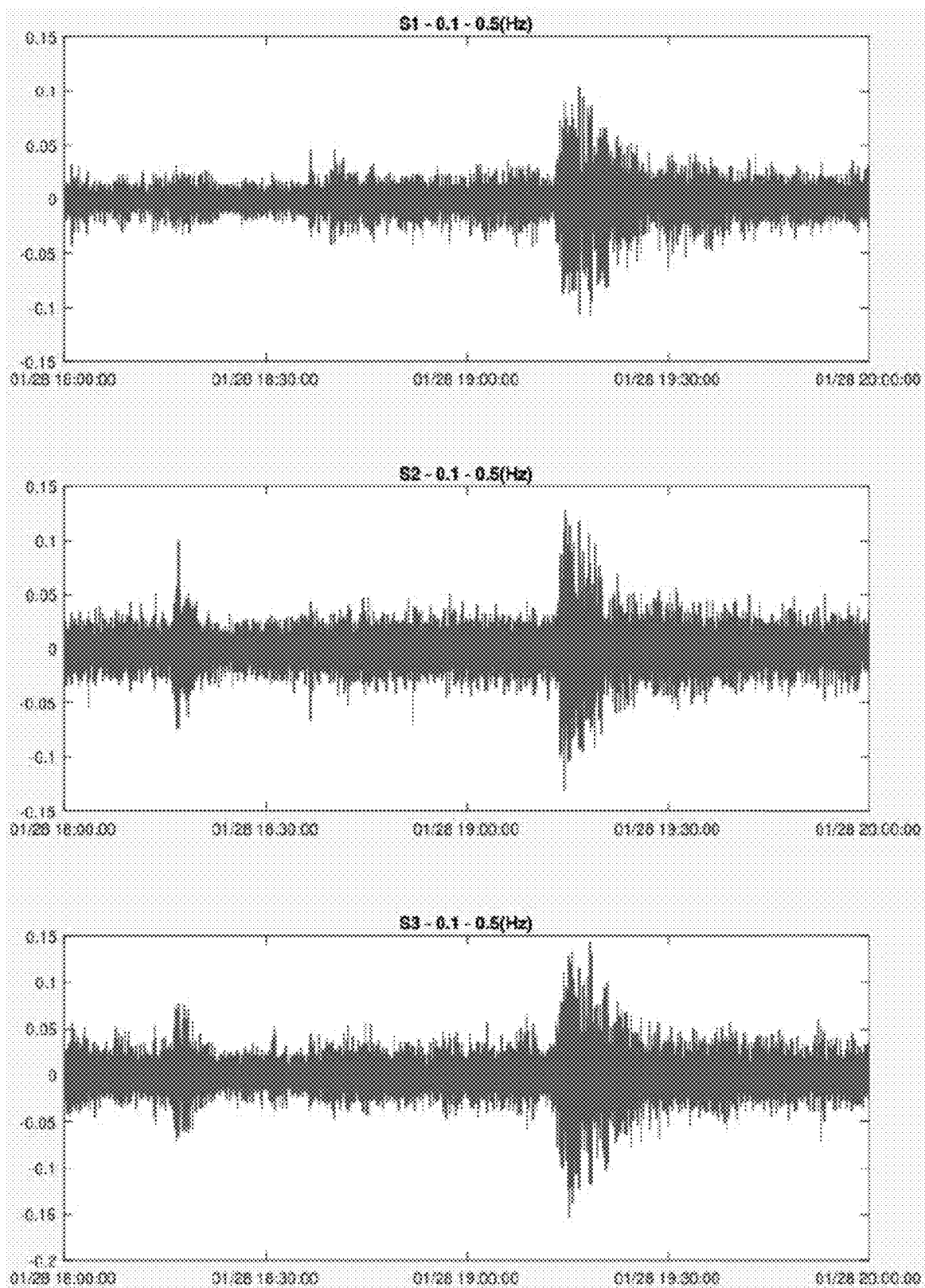
FIG. 7 shows example filtered spectrums in accordance with aspects of the disclosure.

Optionally, filtering may be performed to eliminate data points that are unlikely to be associated with certain seismic events. FIG. 7 illustrates filtering after the time series of polarization states are transformed into spectrums in frequency domain. For example, a first filter may be applied to remove from a spectrum data points having frequencies higher than and/or equal to a first threshold frequency. Additionally or alternatively, a second filter may be applied to remove from a spectrum data points having frequencies lower than and/or equal to a second threshold frequency. In some instances, the appropriate filters to be used may be determined by the range of characteristic frequencies typically associated with certain types of seismic. For example, earthquakes typically have characteristic frequencies ranging between 0.1 Hz and several Hz. As such, the examples of FIG. 7 show time evolution of Stokes parameters S1($t$), S2($t$), S3($t$) after 0.1-0.5 Hz frequency filtering.

Figure 8:
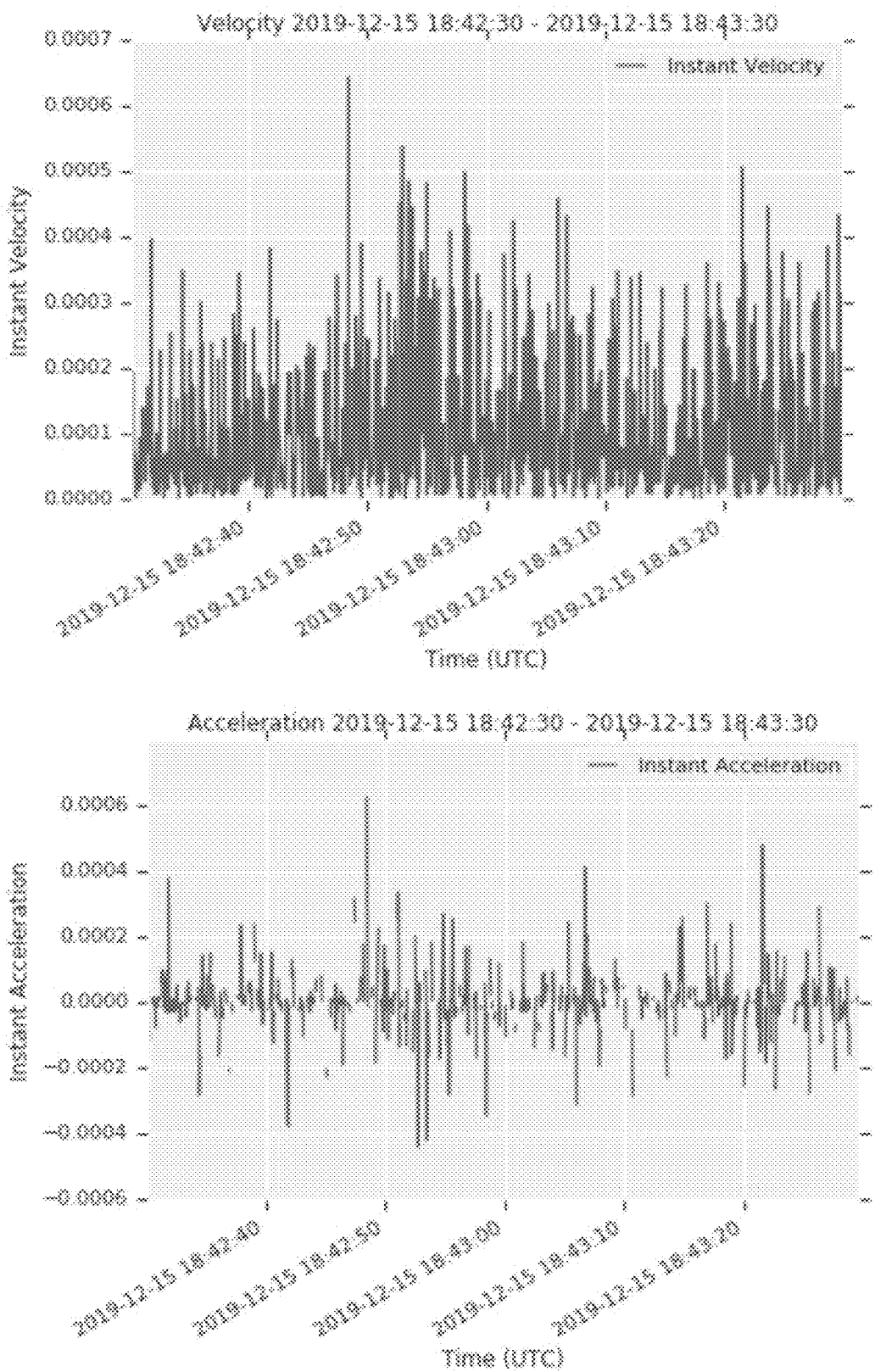
FIG. 8 shows example statistics extracted from time series of polarization states in accordance with aspects of the disclosure.

Additionally or alternatively, statistics may be extracted from the time series of polarization states, which may be used to train the model for detection of seismic events. FIG. 8 illustrates example statistics extracted time series of polarization states. Rates of change of the polarization states, such as instantaneous velocity and instantaneous accelerations shown, may be example statistics that can be extracted from the time series. Other example statistics may include averages, sums, medians, ranges, percentiles, etc.

Returning to FIG. 3, at block 330, seismic activity data is received for the time period, the seismic activity data including one or more seismic events detected in a region at least partially overlapping the underwater optical route. For instance, the seismic activity data may be received by the one or more processors 220 from one or more seismic stations around the world, and/or from databases accessible to the one or more processors 220. The seismic activity data may include information on detected seismic events, such as earthquakes. For example, the seismic activity data may include location information and timing information of the detected earthquakes. The seismic activity data may further include additional information on the detected seismic events, such as characteristic frequencies of seismic waves associated with the detected earthquakes, types of seismic waves associated with the detected earthquakes, magnitudes of the detected earthquakes, locations of the epicenters of the detected earthquakes, etc.

At block 340, a model for detecting seismic events is generated based on the one or more spectrums and the seismic activity data. In this regard, the model may be generated by training a machine learning model, using the one or more spectrums and the seismic activity data. For instance, the model may be trained to recognize patterns in the polarization states of light signals propagating through underwater cables in regions near or overlapping the seismic events while the seismic events were occurring. The model may be any of a number of types of models. For example, the model may be a classification model, a regression model, a neural network model, a random forest model, a decision tree model, etc.

A supervised or semi-supervised training method may be used to train the model. In this regard, the seismic activity data and the spectrums derived from polarization states may be prepared as training data before being used to train a model. For instance, the seismic activity data may be received for a number of regions and a number of time periods, likewise, the spectrums derived from polarization states may be generated for a number of regions with underwater cables and for a number of time periods. As such, the seismic activity data may be correlated with the spectrums with respect to time and location. Then, by comparing the correlated seismic activity data and the spectrums, each spectrum may be labeled with whether a seismic event has been identified. For example, the spectrograms of FIG. 6 were generated based on polarization states collected from 19:00:00 to 19:30:00 on 2020 Jan. 28 from a station along an underwater optical route that passes through water bodies in Jamaica, and seismic activity data received from a seismic station may indicate that an earthquake was detected in Jamaica in a region at least partially overlap the same area as the underwater optical route. Thus, each of the three spectrograms of FIG. 6 may be provided with a label that a seismic event has been detected. Alternatively, since only the spectrums for the time windows from 19:15:00 to 19:20:00 appear to include the high intensity regions 610, 620, 630, only spectrums for these time windows may be provided with a label that a seismic event has been detected, and the spectrums for the other time windows may be provided with a label that no seismic event has been detected. The labeled spectrums may then be used as training data for training the model.

Thus, the model is trained to recognize patterns in the labeled spectrums. For example, the model may be trained to recognize one or more frequencies or frequency patterns that exist in the spectrums labeled as having one or more detected seismic events, but do not exist in spectrums labeled as not having any detected seismic event. Referring to FIG. 6, the model may be trained to recognize patterns in the high intensity regions 610, 620, 630, which are labeled as a seismic event, that distinguish them from the high intensity regions 640, 650, 660, which are labeled as not a seismic event. As new seismic events occur, and as polarization states and seismic activity data are collected for these new events, more spectrums may be generated and labeled as described above. The model may then be further trained with the newly labeled training data, which may improve the detection accuracy of the model.

In addition to determining whether a seismic event has occurred or is occurring. The model may additionally be trained to determine one or more characteristics of the seismic event. As such, the training data may be provided with additional labels. For example, the spectrums may be labeled with the timing of the detected seismic events, using which the model may be trained to recognize patterns in the spectrums that indicate the timing of the seismic events, such as patterns of the initial wavefront of seismic events. Other example labels may include magnitudes of detected earthquakes, characteristic frequencies of detected earthquakes, types of seismic waves associated with detected earthquakes, distances from epicenters of detected earthquakes, etc. The spectrums labeled with such additional information may be used to train the model to recognize patterns in the spectrums that correspond to these characteristics of seismic events. For instance, the model may be trained to recognize that magnitudes of earthquakes are proportional to magnitudes in changes of polarization states.

Once the model is generated, the model may be loaded on one or more computing devices for use. For instance, the model may be loaded on memory 230 and may be used by processors 220 to detect seismic events based on polarization data collected from stations along underwater optical routes. For instance, the one or more processors 220 may receive a set of time series of polarization states, the one or more processors 220 may then transform the set of time series into one or more spectrums in the frequency domain, and provide the spectrums as input to the trained model. The one or more processors 220 may then receive output from the trained model, the output may include whether one or more seismic events are detected based on the spectrums. The output may optionally include additional information such as timing of the detected seismic events, characteristic frequencies of seismic waves associated with the detected seismic events, magnitudes of the detected seismic events, distances from the epicenters of the detected seismic events, etc. Alternatively or additionally, the model may be loaded on one or more other computing devices, such as onto memory 262 and used by processors 261 to detect seismic events, which for example may cause results to be outputted on the display 265.

The model may be optimized by further training. For instance, potential seismic events may be detected by the model, and provided for display. A user may compare the detected events with seismic events detected by stations around the world, and identify whether each of the potential seismic events has been correctly detected. The verified detection and the detections identified as false positives may then be used to further train the model. This way, the model may be trained to learn patterns between correct detections and false positives, and thus make more accurate detections.

Additionally, a location of a detected seismic event may be determined based on the polarization states of a light signal propagating in underwater cable routes. For instance, the model may output a first result including timing information on a detected seismic event based on polarization states collected by one station, the model may also output a second result including timing information on the same seismic event based on polarization states collected by another station. As described below, a location of the detected seismic event may then be determined using the timing information from the two results. Alternatively or additionally, the model described above may be further trained to determine locations for detected seismic events, and generate the locations as part of the output. For instance, spectrums in frequency domain may be derived from polarization states collected from multiple stations for a same time period, each of which may be labeled with the location of a same detected seismic event based on seismic activity data. The model may then be trained with the labeled spectrums to determine locations of detected seismic events using polarization states from multiple stations.

Figure 9:
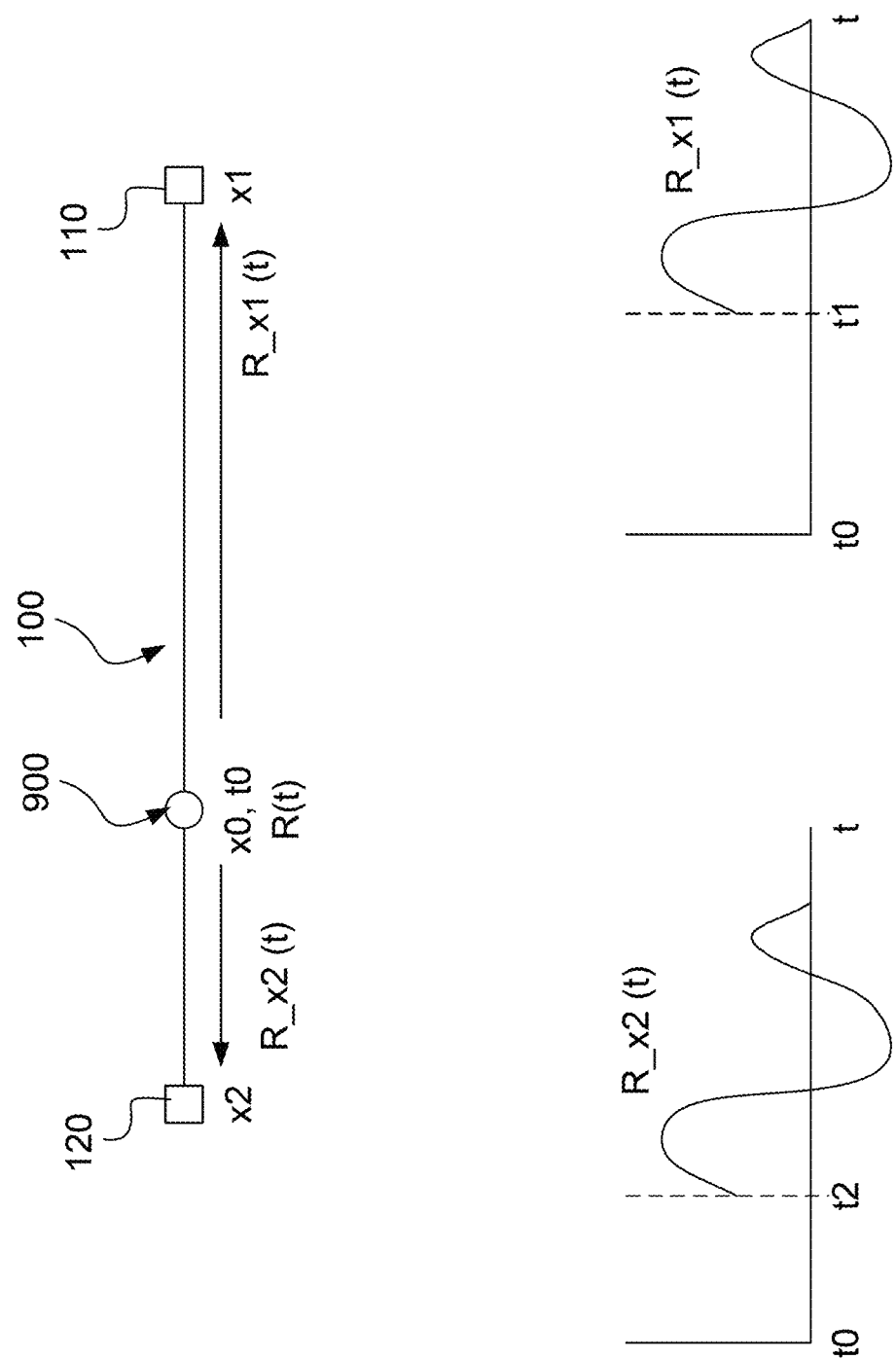
FIG. 9 is a pictorial diagram illustrating determination of a location of a seismic event using polarization states detected at two stations along an optical route in accordance with aspects of the disclosure.

FIG. 9 is a schematic diagram illustrating determination of a location of a seismic event using polarization states detected at two stations along an optical route. FIG. 9 shows the first station 110 at location x1 and the second station 120 at location x2 along the optical route 100. Although the schematic diagram shows the optical route 100 as being a straight line, in practical systems the optical route 100 may have any shape, such as the shape shown in FIG. 1. FIG. 9 further shows that a seismic event 900 originates from a location x0 at time t0 along the optical route 100. Thus for an earthquake, location x0 may be an epicenter of the earthquake, where seismic waves originate and propagate outwards. Although the origin of the seismic event x0 is shown in FIG. 9 as located directly on the optical route 100, the origin of the seismic event x0 need not be on the optical route 100, but may be at a distance such that seismic waves from the origin still can be detected based on the polarization states of light propagating through the optical cable.

The seismic waves hitting underwater optical cable at the location x0 may be represented by a function DELTA(t), the optical signal associated with seismic waves detected by the first station 110 may be represented by a function R_x1(t) and the optical signal associated with seismic waves detected by the second station 120 may be represented by a function R_x2(t). DELTA(t) function may be assumed for simplicity—to separately represent Seismic Wave and the Optical Electro-magnetic Waves represented by R_x1(t) and R_x2(t). The timescales of the two types of waves are so different that detections of Seismic induced distortions in the cable at the two stations appear as instantaneously captured images, similar to cinematograph frames. But when the subsequent approximations are considered, differences in the light propagation times t1 and t2 can be determined. Depending on the distance between x0 and x1 and the distance between x0 and x2, the first station 110 and the second station 120 may detect these seismic waves at different times. Thus as shown, the first station 110 may detect the wavefront originating from location x0 at time t1 and the second station 120 may detect the wavefront originating from location x0 at time t2.

As described above with reference to FIGS. 4A-7, seismic waves may be detected based on characteristics of light signals detected at stations along optical routes. Thus when a wavefront of seismic waves reaches a station along an optical route, a resulting change in characteristics of a light signal may be detected at or around the same time. Thus, referring to FIG. 6 as an example, the beginning of the high-intensity region 610 starting at t1=19:15:00 may correspond to the wavefront reaching the first station 110 at x1, while the beginning of similar high-intensity regions (not shown) starting at t2 sometime before t1 may correspond to the wavefront reaching the second station 120 at x2. The time of detection can be represented by the relationship t=t0+(x−x0)/c_fiber, where x is the location of detection and c_fiber is the speed of light propagating in fiber. Thus, since t1, t2, x1, x2, and c_fiber are known, the relationships t1=t0+(x1−x0)/c_fiber and t2=t0+(x2−x0)/c_fiber can be solved to estimate x0 and t0.

Further, since the length of the optical cable connecting station 110 and station 120 is known, it follows that R_x1 (t)+R_x2(t)=2*t0+L/c_fiber, where L is the length of the optical cable, and c_fiber is the speed of light propagation in the optical cable. Thus, R_x1(t)+R_x2(t) results in a constant, and the relationship can be used to solve for t0. Although the various equations described above may be mathematically solved for an epicenter located along a straight line as the detecting stations, the equations may become very complicated to solve in other situations as interactions of seismic wave and optical cable become distributed in space and time and will be a product of a diffusion equation. In such other situations, machine learning may be used to determine the location, for example by training using known examples.

However, in practical situations, clocks at different stations may not be synchronized, which may introduce further time difference in the detection of a wavefront in addition to the time difference due to the location difference of the detectors. As such, synchronization of clocks at different stations may be performed prior to determining the location of a seismic event. For instance, each station of a plurality of stations used for detecting the seismic event may correct timestamps generated by its respective clock by referencing a common clock. Alternatively, calibration may be performed between multiple stations by sending a known signal at a known time from a known location between the stations. By comparing the timestamps generated by respective clocks of the stations when the known signal is detected, and the expected detection time of the known signal at each of the stations based on the known location, a calibration may be determined for each clock at each respective station. Assuming an accuracy on the order of 1 μs can be achieved, such as by the synchronization methods above, a location accuracy on the order of 100 meters may be achieved for an estimated location of a detected seismic event.

Figure 10:
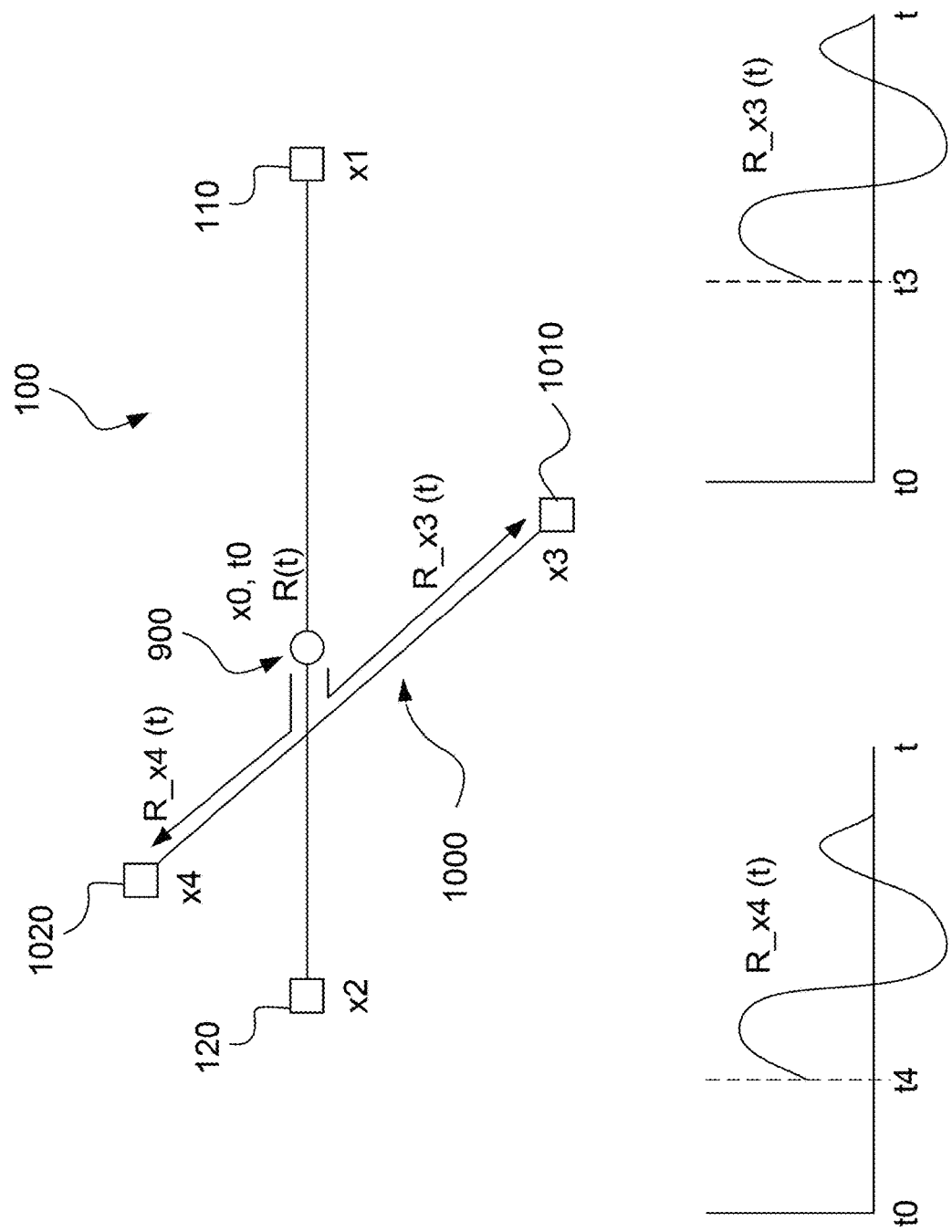
FIG. 10 is a pictorial diagram illustrating determination of a location of a seismic event using triangulation in accordance with aspects of the disclosure.
Figure 11:
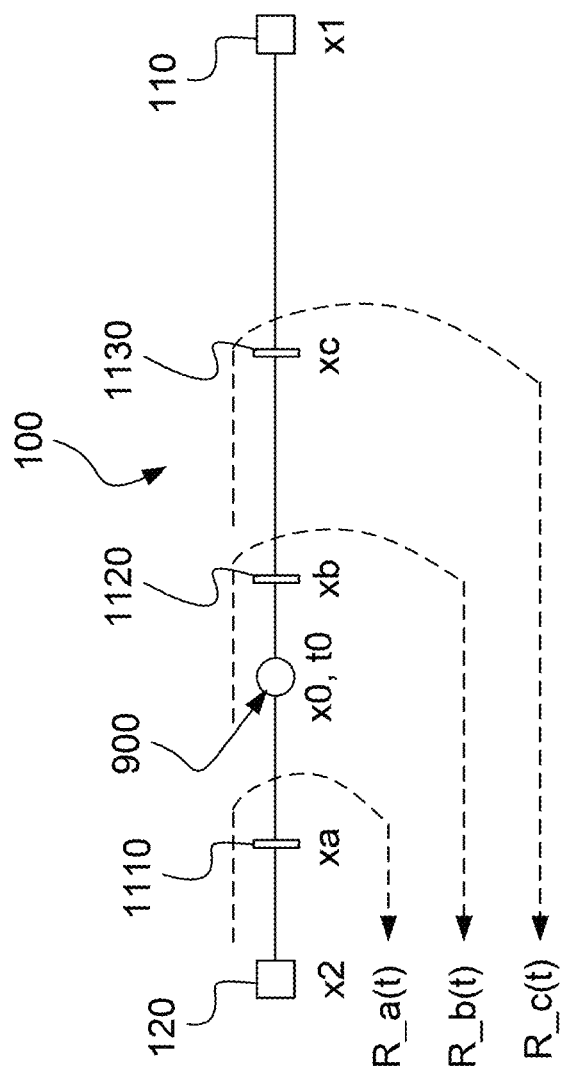
FIG. 11 is a pictorial diagram illustrating determination of a location of a seismic event using looped optical signals in accordance with aspects of the disclosure.
Figure 12:
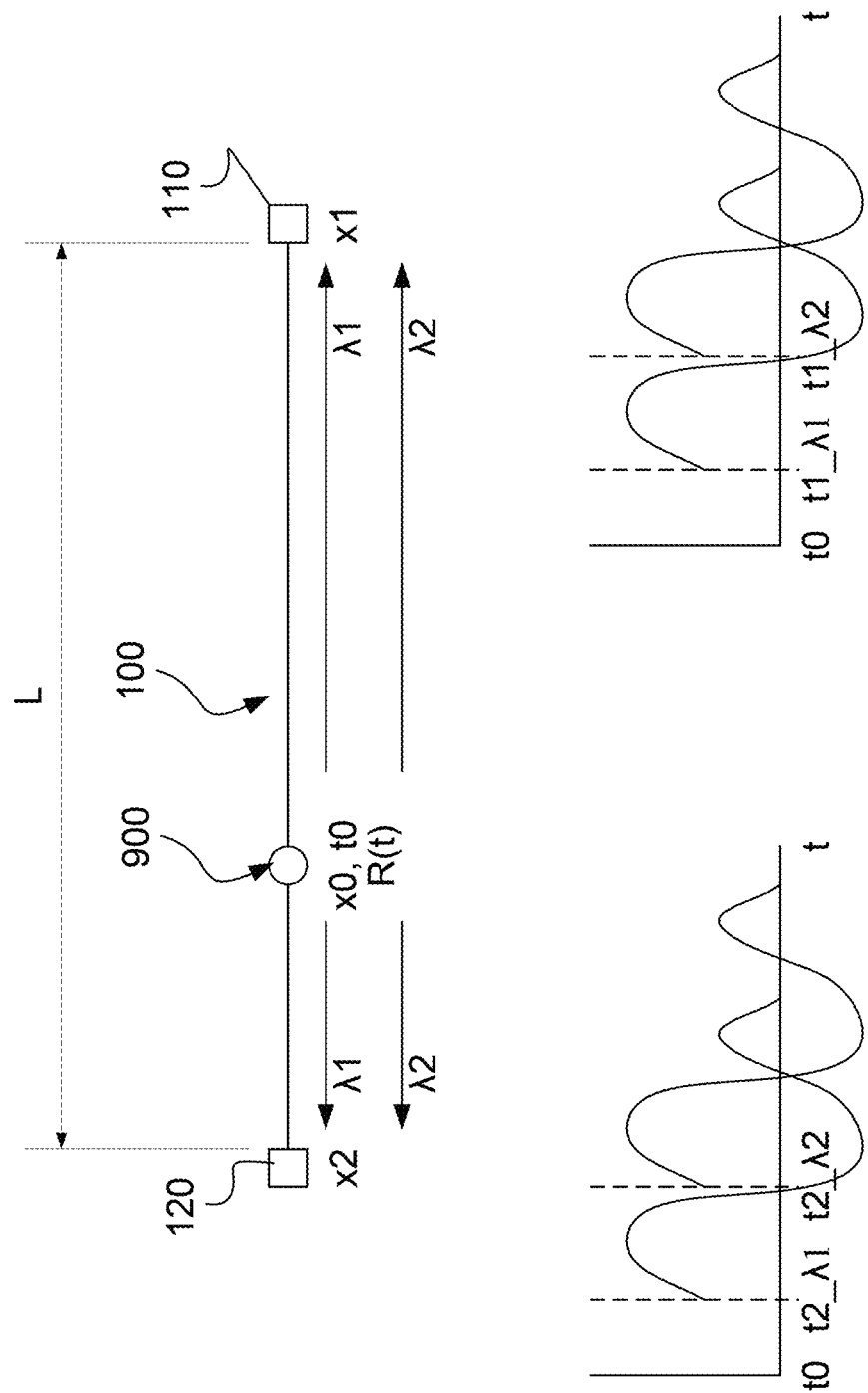
FIG. 12 is a schematic diagram illustrating determination of a location of a seismic event using light signals with different wavelengths in accordance with aspects of the disclosure.

Location accuracy may be further improved in any number of additional ways. For instance, a first estimated location may be determined based on spectrums derived from time series of Stoke parameter S1, a second estimated location may be determined based on spectrums derived from time series of Stoke parameter S2, and a third estimated location may be determined based on spectrums derived from time series of Stoke parameter S3. Thus, with three estimated locations for the seismic event 900, a more accurate estimate for the location of the seismic event 900 may be obtained, for example by averaging the estimates or providing a range. FIGS. 10-12 show other example methods of determining a location of a seismic event.

FIG. 10 is a schematic diagram illustrating determination of a location of a seismic event using triangulation. FIG. 10 shows two stations 1010 and 1020 along optical route 1000 in addition to stations 110 and 120 along optical route 100. Further, the stations and the optical cables connecting them are located such that the seismic event 900 can be detected at all four stations 110, 120, 1010, and 1020. For instance, station 1010 located at x3 may detect waves represented by function R_x3(t), where seismic event 900 is detected at t3, and station 1020 located at x4 may detect waves represented by function R_x4(t), where seismic event 900 is detected at t4. As such, detections of the seismic event 900 at stations 1010 and 1020 further generate additional relationships t3=t0+(x3−x0)/c_fiber and t4=t0+(x4−x0)/c_fiber, which may be solved to determine x0, t0. Thus, with two estimated locations for the seismic event 900, one determined using the detections by stations 110 and 120, and one determined using the detections by stations 1010 and 1020, a more accurate estimate for the location of the seismic event 900 may be obtained, for example by averaging the estimates or providing a range.

FIG. 11 is a schematic diagram illustrating determination of a location of a seismic event using looped-back optical signals. FIG. 11 shows various repeaters 1110, 1120, 1130, 1140 provided between the two stations 110 and 120 along optical route 100. As described above with reference to FIG. 1, repeaters may be provided along an optical route to extend the reach of a light signal between two stations. In some instances, power splitters and mirrors may be provided in the repeaters to create one or more loops of light signals. In this regard, Line Monitoring Systems may be used with repeaters in High-Loss Loop-Backs (HLLB) modes, which may create a monitoring channel with a particular wavelength. By measuring polarization states of the monitoring channel, a location of a seismic event may be determined. In such instances, the particular wavelength chosen may be one that is outside or near the edges of the communication window. For example as shown, repeaters 1110, 1120, 1130 may be provided along the optical route 100. A light signal propagating along the optical route may be looped back at each repeater, and monitored at station 120. As such, if a seismic event is detected based on the signal R_b(t) looped back from repeater 1120, but not the signal R_a(t) looped back from repeater 1110 or the signal R_c(t) looped back from repeater 1130, it may be determined that the seismic event occurred between the first repeater 1110 and the second repeater 1120.

FIG. 12 is a schematic diagram illustrating determination of a location of a seismic event using different wavelengths. FIG. 12 shows that the stations 110 and 120 along optical route 100 are each configured to receive light signals of two wavelengths λ1 and λ2. Light having different wavelengths propagate at different speeds, as such, this speed difference may be leveraged to localize detected seismic events. For instance, detection of the seismic event 900 by station 110 may be represented by relationships x1−x0=c_λ1*t1_λ1, and x1−x0=c_λ2*t1_λ2, which may be combined into t1_λ1−t1_λ2=(x1−x0)(1/c_λ1−1/c_λ2). Likewise, detection of the seismic event 900 by station 120 may be represented by relationships x0−x2=c_λ1*t2_λ1, and x0−x2=c_λ2*t2_λ2, which may be combined into t2_λ1−t2_λ2=(x0−x2)(1/c_λ1−1/c_λ2). Thus x0 and t0 may be estimated by solving the two relationships t1_λ1−t1_λ2=

(x1−x0)(1/c_λ1/c_λ2) and t2_λ1−t2_λ2=(x0−x2)(1/c_λ1−1/c_λ2). Further, because the distance L between the two stations 110 and 120 is a known constant, the relationship x1−x0−(x0−x2)=x1+x2=L may be used to check whether the estimated x0 is accurate. Due to chromatic dispersion in optical cable fiber, such as second derivative of refractive index, the accuracy of detection may be higher when the first wavelength and the second wavelength are far from each other. As an example only and not by limitation, the first wavelength may be 1530 nm and the second wavelength may be 1560 nm.

By far, the most destructive tsunamis are generated from large, shallow earthquakes with an epicenter or fault line near or on the ocean floor. These usually occur in regions of the earth characterized by tectonic subduction along tectonic plate boundaries. The high seismicity of such regions is caused by the collision of tectonic plates. When these plates move past each other, they cause large earthquakes, which tilt, offset, or displace large areas of the ocean floor from a few kilometers to as much as 1,000 km or more. The sudden vertical displacements over such large areas disturb the ocean's surface, displace water, and generate destructive tsunami waves. The waves can travel great distances from the source region, spreading destruction along their path. For example, the Great 1960 Chilean tsunami was generated by a magnitude 9.5 earthquake that had a rupture zone of over 1,000 km. Its waves were destructive not only in Chile, but also as far away as Hawaii, Japan and elsewhere in the Pacific. It should be noted that not all earthquakes generate tsunamis. Usually, it takes an earthquake with a Richter magnitude exceeding 7.5 to produce a destructive tsunami. Most tsunamis are generated by shallow, great earthquakes at subduction zones. More than 80% of the world's tsunamis occur in the Pacific along its Ring of Fire subduction zones.

Figure 13:
FIG. 13 is a photograph showing example underwater optical cable routes along a coast.

Today a tsunami warning system is based on detection using approximately 1,000 buoys. The underwater cable network described herein may be complementary to the existing buoys network. For example, the underwater cable network may cover areas without buoys, and provide an independent warning on the earthquake and tsunami. FIG. 13 shows example underwater cable routes along a coast. Optical cables may connect a number of stations, such as the dozen or so stations shown. For example, each line segment shown in FIG. 13, such as segments 1310 and 1320 may represent a span of optical cable between two stations. Further as shown, while some segments of optical cables, such as segment 1310, may be connecting two stations underwater, others segments of optical cables, such as segment 1320, may be connecting a station underwater to a station on land. The underwater optical cables located near the epicenter of earthquake causing tsunamis will be the nearest sensors to detect possible tsunami and earliest possible warning can be generated based on the polarization changes in fiber as described above.

The technology is advantageous because it leverages existing telecommunication infrastructure for the detection of seismic activities without requiring additional equipment. The current expansive network of underwater optical cables may provide greater coverage of underwater seismic events than the very few existing underwater seismic stations. Detection of seismic events underwater may assist in planning of underwater activities, including selection of optical routes, submarine routes, fishing routes, etc. Detection of underwater seismic events may also be used to achieve a better understanding of terrestrial seismic activities, which may affect many human lives. The model can be refined and refreshed based on human feedback and newly detected seismic events.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of evaluating undersea seismic activity comprising:
receiving, by one or more processors, one or more optical signals from one or more stations located along an underwater optical route, each of the one or more optical signals having a polarization state that can be represented as one or more time series over a duration of time, each of the one or more time series corresponding to a respective Stokes parameter; and
detecting, by the one or more processors, occurrence of a seismic event using a machine learning model based on an analysis of the one or more time series of the polarization states of the one or more optical signals, wherein the machine learning model is trained on prior examples of seismic activity.

2. The method of claim 1, wherein detecting occurrence of a seismic event is based on analysis of only one Stokes parameter of the polarization states of the one or more optical signals.

3. The method of claim 2, wherein the only one Stokes parameter is an S1 parameter.

4. The method of claim 1, wherein detecting occurrence of a seismic event is based on analysis of only two Stokes parameters of the polarization states of the one or more optical signals.

5. The method of claim 1, wherein detecting occurrence of a seismic event is based on analysis of three Stokes parameters of the polarization states of the one or more optical signals.

6. The method of claim 5, wherein the three Stokes parameters are an S1 parameter, an S2 parameter, and an S3 parameter.

7. The method of claim 1, wherein detecting occurrence of a seismic event is based on analysis of four Stokes parameters of the polarization states of the one or more optical signals, wherein the four Stokes parameters are an S0 parameter, an S1 parameter, an S2 parameter, and an S3 parameter.

8. The method of claim 1, wherein the one or more optical signals are received only over a night-time period.

9. The method of claim 1, wherein detecting occurrence of a seismic event comprises:
converting the one or more time series from time domain signals to frequency domain signals; and
detecting the frequency domain signals to have a characteristic frequency associated with seismic activity.

10. The method of claim 9, wherein the characteristic frequency is on the order of 0.1 Hz or on the order of 1 Hz.

11. The method of claim 9, wherein the characteristic frequency is between 0.1 Hz and 0.5 Hz.

12. The method of claim 9, further comprising filtering the frequency domain signals to eliminate data points outside of a predetermined range of the characteristic frequency.

13. The method of claim 12, wherein the range of the characteristic frequency is defined by a first threshold frequency at a maximum of the range of the characteristic frequency and a second threshold frequency at a minimum of the range of the characteristic frequency.

14. The method of claim 1, wherein the prior examples of seismic activity are represented as labeled spectrums.

15. The method of claim 1, wherein the machine learning model is one of a classification model, a regression model, a neural network model, a random forest model, or a decision tree model.

16. A system for evaluating undersea seismic activity comprising:
one or more processors configured to:
receive from a first station of a plurality of stations, one or more optical signals from one or more stations located along an underwater optical route, each of the one or more optical signals having a polarization state that can be represented as one or more time series over a duration of time, each of the one or more time series corresponding to a respective Stokes parameter; and
detect occurrence of a seismic event using a machine learning model based on an analysis of the one or more time series of the polarization states of the one or more optical signals, wherein the machine learning model is trained on prior examples of seismic activity.

17. The system of claim 16, wherein the one or more processors are configured to detect occurrence of the seismic event based on analysis of only one Stokes parameter of the polarization states of the one or more optical signals.

18. The system of claim 16, wherein the one or more processors are configured to detect occurrence of the seismic event based on analysis of each of S1, S2 and S3 Stokes parameters of the polarization states of the one or more optical signals.

19. The system of claim 16, wherein the one or more processors are configured to:
convert the one or more time series from time domain signals to frequency domain signals; and
detect occurrence of the seismic event based on the frequency domain signals having a characteristic frequency associated with seismic activity.

20. The system of claim 19, wherein the characteristic frequency is on the order of 0.1 Hz or on the order of 1 Hz.

* * * * *